(12) United States Patent
Moschopoulos et al.

(10) Patent No.: US 11,880,314 B1
(45) Date of Patent: Jan. 23, 2024

(54) MICROCONTROLLER FOR DRIVING AN EXTERNAL DEVICE

(71) Applicant: Dialog Semiconductor B.V., 's-Hertogenbosch (NL)

(72) Inventors: Nikolaos Moschopoulos, Athens (GR); Konstantinos Kottikas, Palaio Falira (GR); Simon de Groot, Heesch (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 1250 days.

(21) Appl. No.: 16/047,681

(22) Filed: Jul. 27, 2018

(51) Int. Cl.
*G06F 13/10* (2006.01)
*G06F 1/26* (2006.01)

(52) U.S. Cl.
CPC ............ *G06F 13/102* (2013.01); *G06F 1/266* (2013.01)

(58) Field of Classification Search
None
See application file for complete search history.

(56) References Cited

U.S. PATENT DOCUMENTS

| | | | |
|---|---|---|---|
| 5,461,266 A | 10/1995 | Koreeda et al. | |
| 8,966,660 B2 * | 2/2015 | Koushanfar | G06F 21/10 726/32 |
| 9,286,266 B1 * | 3/2016 | Fleck | G07C 5/0825 |
| 9,563,398 B2 * | 2/2017 | Mishra | G06F 5/065 |
| 10,210,117 B2 * | 2/2019 | Gittins | G06F 3/0619 |
| 10,799,127 B2 * | 10/2020 | Wei | A61B 5/02416 |
| 11,513,991 B2 * | 11/2022 | Wietfeldt | G06F 13/4282 |
| 2003/0123327 A1 | 7/2003 | Guanter | |
| 2003/0123328 A1 | 7/2003 | Guanter | |
| 2005/0044916 A1 | 3/2005 | Honjo et al. | |
| 2005/0137757 A1 * | 6/2005 | Phelan | G07C 5/02 701/1 |
| 2008/0059669 A1 * | 3/2008 | Lin | G06F 13/4031 710/110 |
| 2008/0140661 A1 * | 6/2008 | Pandya | G11C 15/043 |
| 2008/0313480 A1 * | 12/2008 | Malhi | G06F 1/3203 713/323 |
| 2010/0205468 A1 | 8/2010 | Kim | |
| 2011/0004199 A1 * | 1/2011 | Ross | A61B 90/98 606/1 |
| 2013/0073112 A1 * | 3/2013 | Phelan | G07C 5/02 701/1 |
| 2013/0080819 A1 | 3/2013 | Bowling et al. | |
| 2014/0075247 A1 * | 3/2014 | Lin | G06F 11/0745 714/38.12 |

(Continued)

*Primary Examiner* — Henry Tsai
*Assistant Examiner* — Christopher A Bartels
(74) *Attorney, Agent, or Firm* — Saile Ackerman LLC; Stephen B. Ackerman

(57) ABSTRACT

A method is provided for using a microcontroller for driving an external device, where the microcontroller comprises a processor coupled to a controller, and the controller comprises a state machine coupled to a storage medium configured to store at least one command executable by the state machine. A drive signal is generated using the controller to drive the external device. The storage medium may be configured by the processor with various commands and waveforms for operating different types of external devices. The proposed microprocessor permits reducing power consumption while at the same time allowing for a broad flexibility of use.

15 Claims, 6 Drawing Sheets

(56) References Cited

U.S. PATENT DOCUMENTS

| | | | |
|---|---|---|---|
| 2015/0301979 A1* | 10/2015 | Mishra | G06F 13/4022 |
| | | | 710/106 |
| 2016/0109861 A1 | 4/2016 | Kim et al. | |
| 2016/0154753 A1* | 6/2016 | Gittins | G06F 12/0811 |
| | | | 710/117 |
| 2016/0216752 A1 | 7/2016 | Kim et al. | |
| 2016/0224489 A1* | 8/2016 | Mishra | G06F 13/364 |
| 2016/0259702 A1* | 9/2016 | Mishra | G06F 1/3209 |
| 2016/0275015 A1* | 9/2016 | Gittins | G06F 12/0815 |
| 2016/0299714 A1* | 10/2016 | Gittins | G06F 12/0815 |
| 2016/0299857 A1* | 10/2016 | Gittins | G06F 13/20 |
| 2016/0321205 A1* | 11/2016 | Gittins | G06F 3/067 |
| 2017/0039162 A1* | 2/2017 | Mishra | G06F 13/385 |
| 2017/0075852 A1* | 3/2017 | Mishra | G06F 13/4282 |
| 2018/0329856 A1* | 11/2018 | Mishra | G06F 13/102 |
| 2018/0359117 A1* | 12/2018 | Wietfeldt | G06F 13/4282 |
| 2019/0050366 A1* | 2/2019 | Mishra | G06F 9/30101 |
| 2019/0129881 A1* | 5/2019 | Wietfeldt | G06F 9/542 |
| 2019/0385057 A1* | 12/2019 | Litichever | H04L 63/14 |
| 2021/0208189 A1* | 7/2021 | Flores | G06F 11/0793 |

\* cited by examiner

|  | RTC + CPU driving GPIO (510) | RTC + Controller driving GPIO (520) |
|---|---|---|
| Gear Box Current | 2.5mA | 2.5mA |
| CPU driving GPIOs | 1.5mA | None Applicable (NA) |
| CPU idle (WFI) | 0.002mA | NA |
| Motor Controller driving GPIOs | NA | 0.01mA |
| Motor Controller idle | NA | 0.5uA |
| RTC | Negligible | Negligible |
| Oscillator XTAL32K | Negligible | Negligible |
| System's Active Charge (for a 5ms long waveform) | 5ms*(2.5+1.5)mA*6times = 120uC | 5ms*2.51mA*6times = 75uC |
| System's Waiting Charge (for a 5ms long waveform) | 970ms * 0.002mA = 2uC | 970ms * 0.0005mA = 0.5uC |
| Average Current over 1 Minute | 120 uA | 75 uA |

FIG. 5

MICROCONTROLLER FOR DRIVING AN EXTERNAL DEVICE

TECHNICAL FIELD

The present disclosure relates to a microcontroller for driving an external device.

BACKGROUND

Wearable devices such as smart watches, include an ever-increasing number of functionalities which put strain of the overall power consumption of the device. These functionalities may be embodied via various motors and other type of actuators. For instance, a smart watch may include multiple analogue hands moved by miniaturized step motors; it may also be provided with an alarm system providing a ring tone or a vibration via a haptic actuator. To move these actuators, a digital pulse train is applied to one or more pins of the actuator itself. This pulse train is generated by a System of Chip (SoC) provided with a processor that can manipulate general purpose input/output (GPIOs) fast enough to meet the actuator requirements. In cases where a watch is equipped with multiple hands or other actuators, the processor must wake up several times per second to operate the hands accordingly. This increases the power consumption of the device and decreases its battery lifetime.

It is an object of the disclosure to address one or more of the above-mentioned limitations.

SUMMARY

According to a first aspect of the disclosure, there is provided a microcontroller for driving an external device, the microcontroller comprising a processor coupled to a controller, the controller configured to generate a drive signal to drive the external device, where the controller comprises a state machine coupled to a storage medium configured to store at least one command executable by the state machine.

Optionally, the controller comprises a communication interface coupled to the state machine, the communication interface configured to receive a logic signal from the state machine and to generate the drive signal based on the logic signal.

Optionally, the storage medium is configured to store at least one signal-profile.

A signal-profile may be stored as a plurality of parameters describing the signal-profile. For example, the signal-profile may be a waveform or a pulse-train. A signal-profile may include a shape parameter, an amplitude parameter and a frequency parameter.

Optionally, the at least one command comprises a plurality of commands and the storage medium is configured to store a plurality of signal-profiles, where each command among the plurality of commands is associated with a signal-profile among the plurality of signal-profiles.

Optionally, the plurality of commands may be organized as a first queue and the plurality of signal-profiles may be organized as a second queue.

For example, the both the first and second queues may be implemented as a first in first out FIFO queue.

Optionally, the processor is part of a first power domain and the controller is part of a second power domain, and the microcontroller further comprises a power domain controller coupled to the first power domain and to the second power domain.

Optionally, the microcontroller comprises a notifier coupled to the power domain controller, and the notifier is configured to provide a notification signal to the power domain controller to enable the state machine.

Optionally, the notifier comprises a wake-up controller, and the wake-up controller is configured to receive an alert signal and to provide the notification signal upon receipt of the alert signal.

For example, the alert signal may be triggered by an event that is internal or external to the microcontroller.

Optionally, the notifier comprises a timer configured to send the notification signal at specific times.

For example, the timer may be configured to provide a time period associated with the external device and to send the notification signal when the time period has expired. The timer may be configured to send the notification signal at regular intervals.

Optionally, the microcontroller comprises a terminal connecting the external device to the microcontroller, where the wake-up controller is coupled to the terminal and to the power domain controller, and the wake-up controller is configured to receive an alert signal from the external device and to send the notification signal to the power domain controller.

Optionally, the external device comprises an actuator, and the plurality of commands is configured to operate the actuator, and the plurality of signal-profiles comprises a plurality of waveforms for driving the actuator.

Optionally, the external device comprises a transmitter for transmitting data, and the plurality of commands comprises a first command for enabling the transmitter and a second command for transmitting data.

Optionally, the signal-profiles comprise information to be transmitted by the transmitter.

Optionally, the microcontroller is for use with a plurality of external devices, where the communication interface comprises a plurality of communication controllers, each communication controller configured to control an external device among the plurality of external devices.

Optionally, the processor configures the storage medium.

According to a second aspect of the disclosure, there is provided a wearable device comprising a microcontroller as claimed coupled to one or more external devices. For example, the wearable device may be a watch such as a smart watch.

Optionally, the one or more external devices comprise at least one of a motor, a haptic device, a transmitter and a light.

The wearable device according to the second aspect of the disclosure may comprise any of the features described above in relation to the microcontroller according to the first aspect of the disclosure.

According to a third aspect of the disclosure, there is provided a method of operating an external device, comprising the steps of providing a microcontroller for driving the external device, the microcontroller comprising a processor coupled to a controller, where the controller comprises a state machine coupled to a storage medium configured to store at least one command executable by the state machine, and generating a drive signal to drive the external device using the controller.

Optionally, the method comprises executing the command to generate a logic signal and generating the drive signal based on the logic signal.

Optionally, the storage medium is configured to store at least one signal-profile associated with the command.

The method according to the third aspect of the disclosure may share features of the first aspect as noted above and herein.

BRIEF DESCRIPTION OF THE DRAWINGS

The disclosure is described in further detail below by way of example and with reference to the accompanying drawings, in which:

FIG. 5 is a table listing the current consumption for various components of a microcontroller according to the prior art and a microcontroller according to the disclosure.

DETAILED DESCRIPTION

Figure 1:
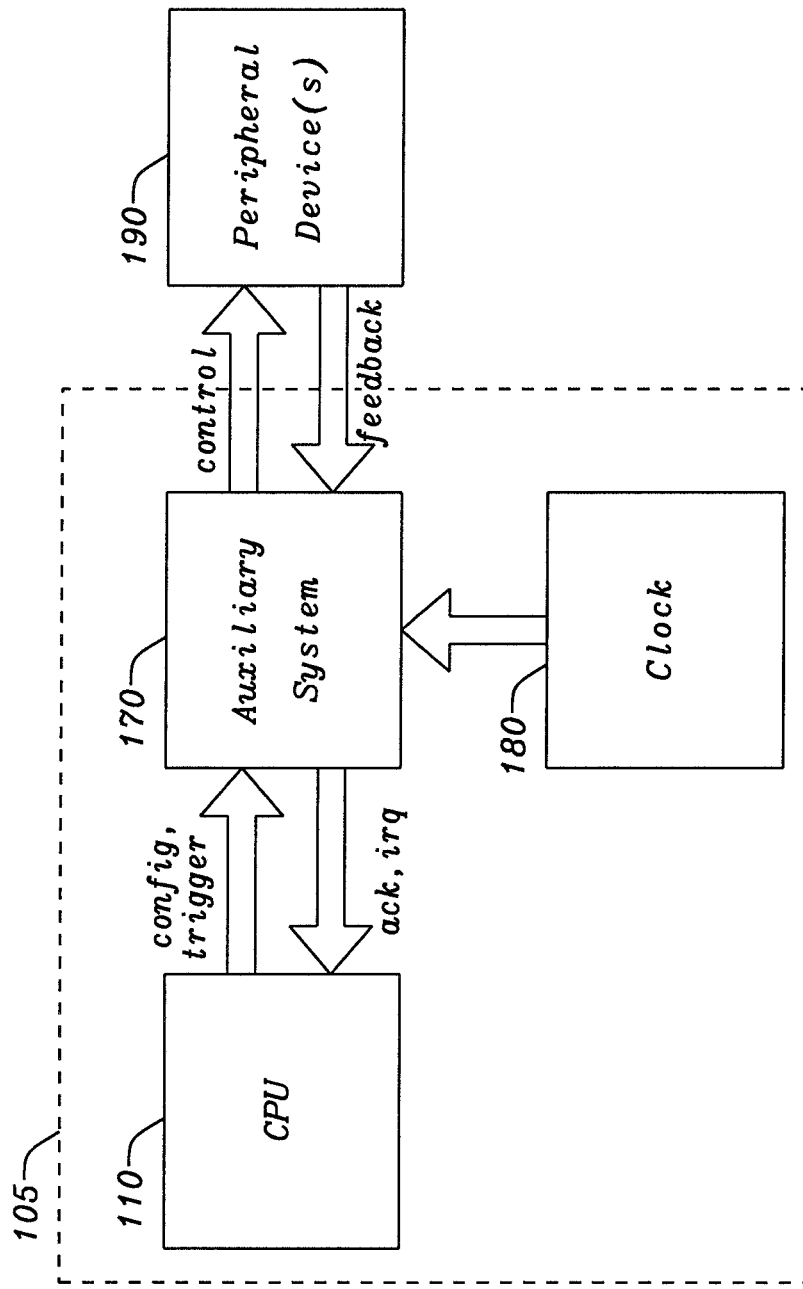
FIG. 1 is a diagram of a microcontroller comprising an auxiliary system for driving one or more external devices.

FIG. 1 illustrates a microcontroller for driving one or more external devices. The microcontroller 105 is coupled to a plurality of devices also referred to as peripherals 190 which are external to the microcontroller chip.

The microcontroller 105 may be adapted to drive different types of external devices. For instance, the external devices may include an actuator such as a stepper motor, or a haptic device such as an eccentric rotating mass (ERM) or a linear resonant actuator (LRA). Other devices may include a light such as an LED or a transmitter such as an alarm radio.

The microcontroller 105 includes a processor or CPU 110, an auxiliary system, also referred to as controller 170 and optionally a clock 180.

In operation, the CPU 110 may be activated to configure the auxiliary system 170. Once configured, the auxiliary system is adapted to provide a drive signal to the one or more external devices autonomously, hence without the processor 110.

Depending on the application, a peripheral device 190 may send a feedback signal to the auxiliary system 170 to indicate that a particular action has been completed.

The clock 180 may be used to wake up the auxiliary system to perform a specific task at particular time intervals without the use of the CPU. For instance, repetitive tasks which may include moving a hand on a watch every minute, can be achieved by the clock 180 waking up the auxiliary system 170 to send a drive signal to a stepper motor to move the hand every minute. Since the CPU 110 is not used, significant reduction in power consumption of the system can be achieved.

Figure 2:
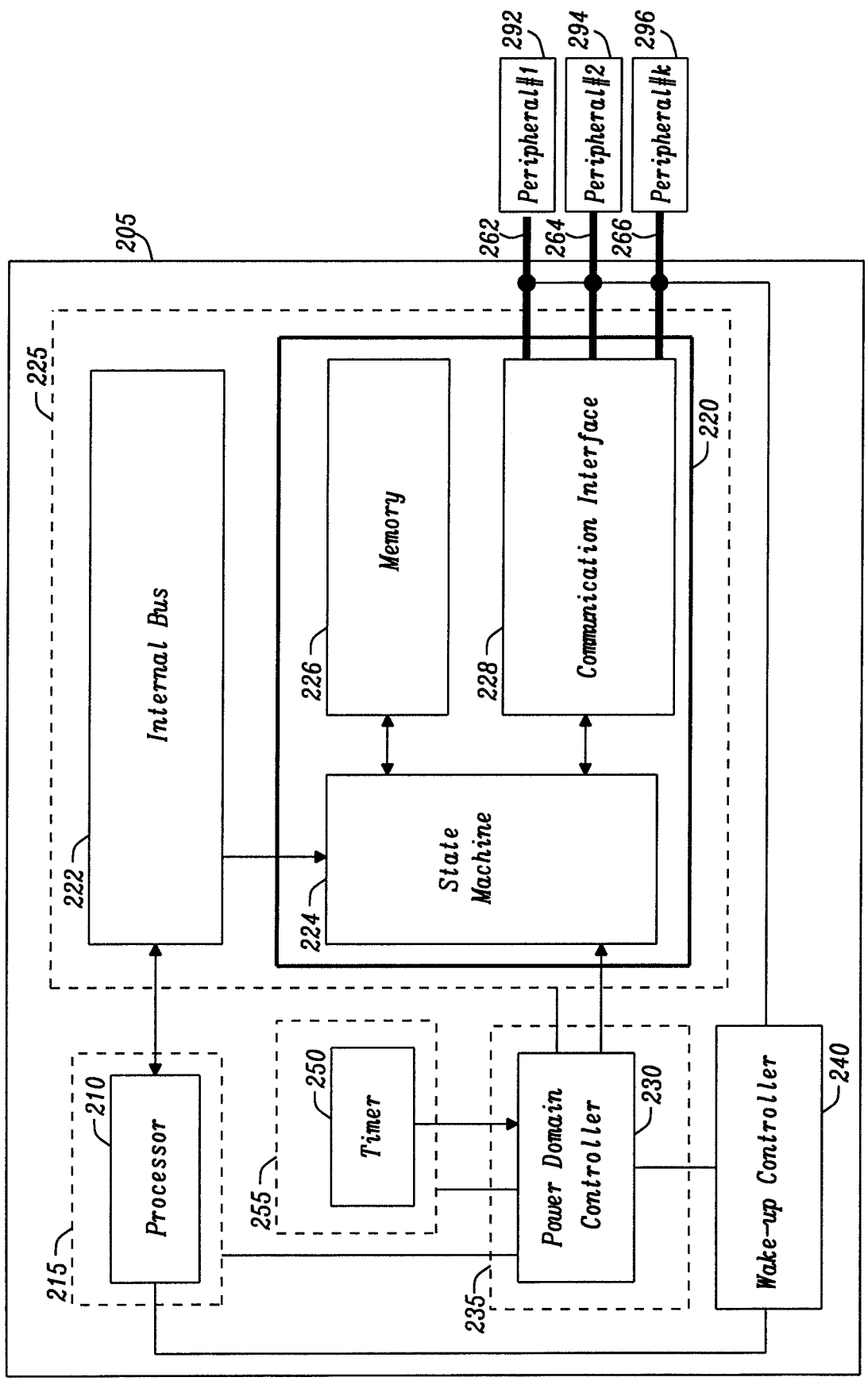
FIG. 2 is an exemplary implementation of the microcontroller of FIG. 1, illustrating a microcontroller chip coupled to a number of peripheral devices which are external to the chip.

FIG. 2 illustrates a microcontroller chip coupled to a number of peripheral devices which are external to the chip. The peripherals may be different kinds of passive peripherals, for instance an actuator, a light such as an LED or a beacon for transmitting information. Examples of actuators may include a step motor, a motor for moving a hand watch, a haptic device for providing vibrations on a phone etc.

The system includes the microcontroller 205 and the peripherals 292, 294 and 296. The microcontroller 205 is provided with a processor 210 coupled to an auxiliary system 220 via an internal bus 222. The microcontroller 205 also includes a power domain controller 230, a wake-up controller 240 and optionally a timer 250. The auxiliary system 220 includes a state machine 224, a storage medium or memory 226, and a communication interface 228.

The internal bus 222 couples the processor 210 to the state machine 224 and to the memory 226. The state machine 224 is coupled to the memory 226 and to the interface communication 228. The peripherals 292, 294 and 296 are coupled to the power domain controller 230 via the wake-up controller 240. The wake-up controller 240 is also coupled to the processor 210. Optionally, a timer 250 may be coupled to the domain controller 230. The timer 250 may be a real-time clock RTC for generating a time signal. The time signal may be generated at regular intervals for instance, every minute or every hour. The timer 250 may be replaced by an external processor or a button to perform a particular task.

The communication interface 228 may have a first terminal 262 for connecting the microcontroller to the peripheral #1 292, a second terminal 264 for connecting to the peripheral #2 294, and a third terminal 266 for connecting to peripheral #k 296. The wake-up controller 240 may be coupled to peripherals via the terminals 262, 264 and 266. A peripheral device may be adapted to perform an interrupt request IRQ to initiate a hardware interrupt, that is a signal indicating to the wake-up controller 240 that the peripheral device requires attention.

The microcontroller 205 includes a plurality of power domains also referred as power islands, for operating different regions of the chip at different voltages and frequencies independently from one another. The number of power islands may vary. In this example, the microcontroller 205 includes four different power domains. A first power island 215 is provided to power the processor 210, a second power island 225 is provided for powering the auxiliary system 220, a third power island 235 is provided for the power domain controller 230 and a fourth power island 255 is provided to power the timer 250. The power domain controller 230 is coupled to each one of the power islands 215, 225, 235 and 255. In different embodiments, the number of power islands may vary.

The state machine 224, also referred to as final state machine FSM, is coupled to the internal bus 222, to the memory 226 and to the communication interface 228. The state machine 224 may be formed by a plurality of memory elements, such as latches, and flip flop coupled to logic gates. The state machine may be customized to execute specific commands. The state machine is adapted to read the commands stored in the memory 226 and to generate a logic signal for use by the communication interface 228.

As previously described, the processor 210 is coupled to the memory 226 via the internal bus 222. The processor 210 may be used to program the memory 226 with a set of commands or instructions directed to the state machine 224. For instance, a set of commands may be a list of instructions or steps that needs to be executed in a particular order.

When a peripheral requires attention, it may send an interrupt request IRQ to the wake-up controller 240 to wake up the power domain controller 230. The power domain controller 230 then wakes up the power island 215 of the processor 210. Once the processor 210 is turned on, the wake-up controller 240 can communicate with it. For instance, the wake-up controller 240 may request the processor 210 to configure the memory 226 in a certain way to perform a certain task. The state machine 224 then accesses the memory 226, reads the command stored in the memory, generates and sends a logic signal to the communication interface 228. The communication interface 228 receives the logic signal from the state machine 224 and generates one or more drive signals to drive the one or more peripheral devices 292, 294 and 296. The peripherals may send a feedback signal to the state machine 224 via the communication interface 228. For instance, a peripheral may send a feedback signal to indicate that a particular step has been completed and that a next step should be performed.

In another mode of operation, the timer 250 may be used to activate the state machine 224. For instance, when a repetitive task is required, the timer 250 sends a signal to the power controller 230 to wake up the state machine 224 to perform the said task. This can be achieved without waking up the processor 210 and therefore, saving energy.

Figure 3:
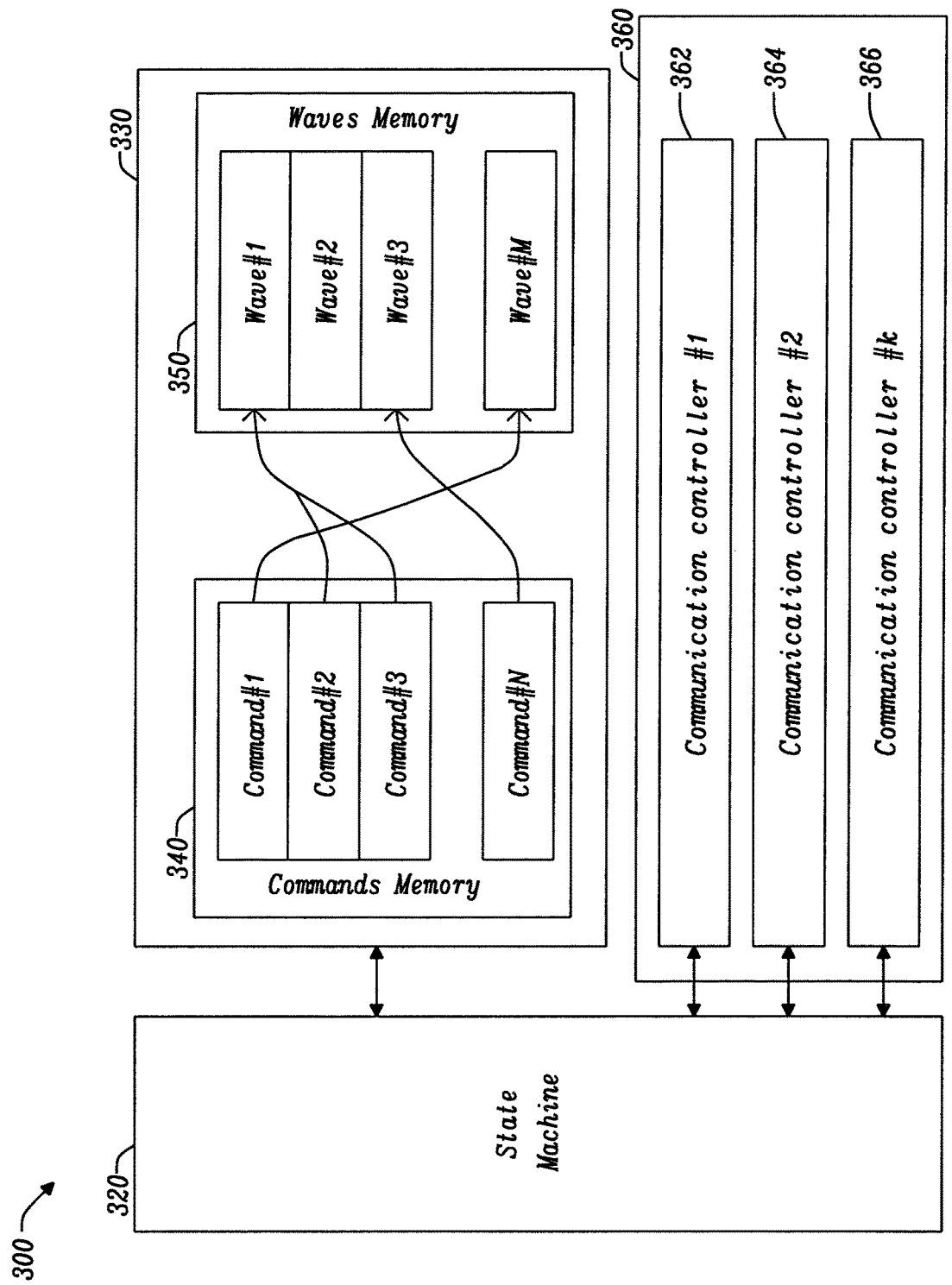
FIG. 3 is an exemplary implementation of an auxiliary system or controller.

FIG. 3 is an exemplary embodiment of an auxiliary system or controller 300. The auxiliary system includes a state machine 320, a memory 330 and a communication interface 360. The memory 330 includes a first memory referred to as commands memory 340 and a second memory referred to as waves memory 350. The first memory 340 is adapted to store a plurality of commands in a particular sequential order. The second memory 350 is adapted to store a plurality of signal-profiles such as a plurality of waveforms or pulse-trains. A signal-profile may be stored as a plurality of parameters describing the signal-profile. Such parameters may include any information allowing replicating the signal-profile. For instance, a signal-profile may be defined by various parameters including a waveform shape, an amplitude, a frequency, a number of pulses contained by the wave, and a number of toggle points or toggle durations. A toggle duration represents an amount of time before the wave toggles from a high value to a low value or from a low value to a high value. For example, a waveform may have a square shape, a triangular shape, a trapezoidal shape, a sinusoidal shape or a stepped sinusoidal shape. A signal-profile may be a Pulse-Width Modulated (PWM) signal. A signal-profile may be associated with a command stored in the first memory 340. Multiple commands stored in the first memory 340 may be associated with a same signal-profile stored in the second memory 350. The sequence of commands provided in the first memory 340 might be configured in different ways. For instance, a sequence may be configured in a cyclic mode or in a linear mode also referred to as run through mode. In the cyclic mode the sequence of commands may be read repetitively, while in the linear mode the sequence of command may be read from the first command to the last command. The set of commands and the set of signal-profiles stored in the first and second memories may be organised as a queue, such as a first in first out FIFO queue.

The communication interface 360 includes a plurality of communication controllers #1 362, #2 364 and #k 366. Each communication controller may be used to control one or more peripheral device. The communication controllers 362, 364, and 366 may be implemented in different ways. A communication controller may be a serial controller or a parallel controller. For example, a communication controller may be a General Purpose Input Output (GPIO); a Serial Peripheral Interface (SPI); a Universal Asynchronous Receiver/Transmitter (UART); an Inter IC (I2C) bus or an Analog to Digital Converter (ADC). The number of communication controllers may vary depending on the number of peripheral devices. Each communication controller is adapted to receive a logic signal from the state machine 320 and to generate one or more drive signals based on the logic signal to drive one or more external device. For example, a communication controller may include an H-bridge driver for driving an actuator such as a haptic device. The H-bridge driver may be coupled to a pulse width modulation controller.

It will be appreciated that various commands may be stored in the memory 340 for operating different types of devices. For example, if the external device is a motor for operating a hand watch, a command may include instructions to move the hand in a clockwise direction by several degrees. If the external device is a haptic device such as an ERM, a command may include instructions to rotate the mass of the ERM for certain laps of time. If the external device is a speaker, a command may include instructions to transmit an acoustic signal for a certain laps of time. If the external device is an LED light, a command may include instructions relating to a duty cycle and a frequency of the PWM signal controlling the intensity of the LED.

A command may include an identifier or an identification field to address a specific communication controller, or multiple communication controllers. The command may also include a pointer to a particular signal-profile or waveform. It may also include an idle parameter, indicating a time duration during which nothing happens. Depending on the configuration of the command, the communication interface 360 may output the generated drive signal to one or more terminals.

As mentioned above, a plurality of commands may be provided to operate a particular external device. Considering a stepper motor, a set of command may include three commands. A first command corresponding to instructions to move the stepper motor by a certain number of steps, or for a certain duration in a forward direction; a second command corresponding to instructions to move the stepper motor by a certain number of steps, or for a certain duration in a backward direction; and a third command corresponding to instructions to move the stepper motor to a reference position.

Each command may be associated with a specific signal-profile. A first signal-profile may be waveform having a first shape for example a square waveform shape, a first amplitude A1 and a first frequency F1. A second signal-profile may be waveform having a second shape for example a triangular waveform shape, a second amplitude A2 and a second frequency F2. A third signal-profile may be waveform having a third shape for example a sinusoidal waveform shape, a third amplitude A3 and a third frequency F3. By driving the stepper motor with a particular shape frequency and amplitude, the stepper motor may be moved at a particular speed.

If the external device is a transmitter for transmitting data; a first command may be an instruction for enabling the transmitter; a second command may be an instruction for transmitting data; and a third instruction may be an instruction to disable the transmitter. A signal-profile associated with the second command may include information/data to be transmitted by the transmitter.

Figure 4:
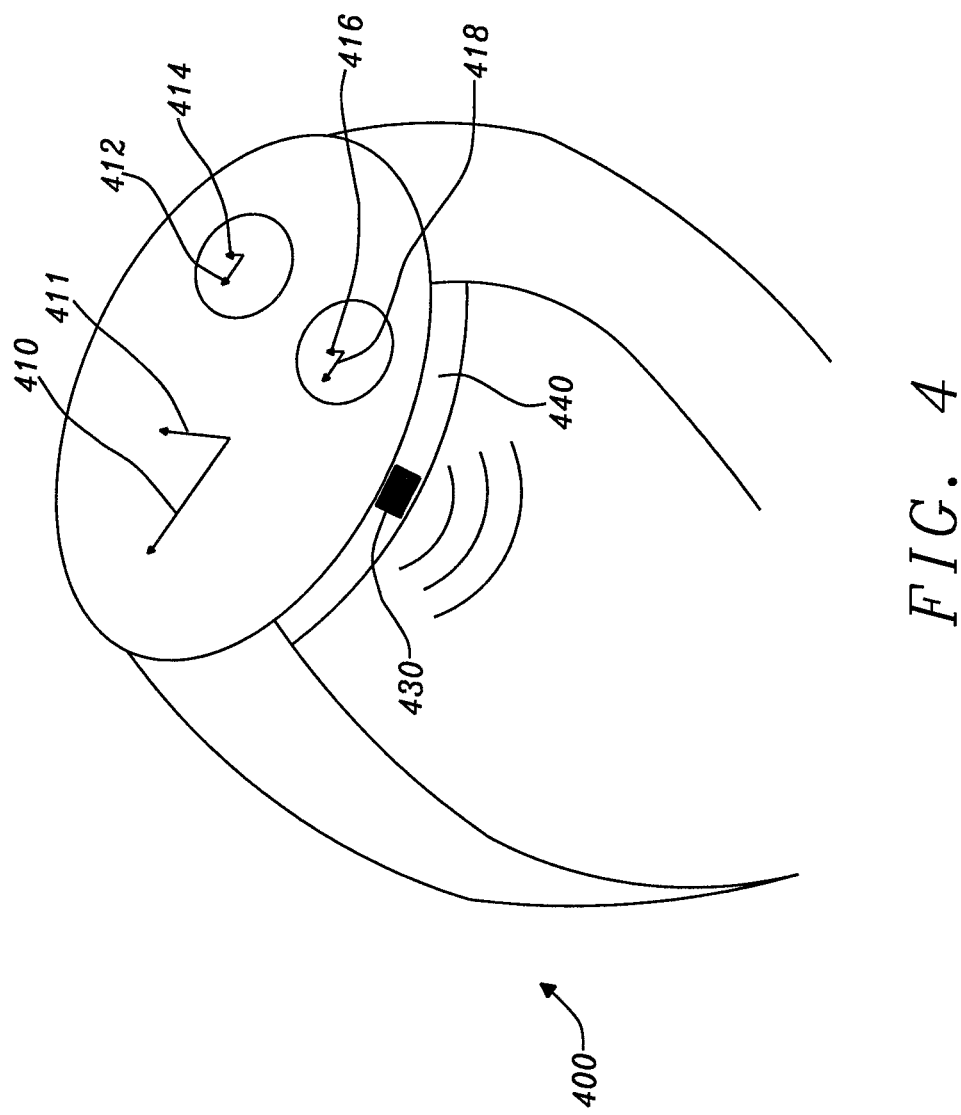
FIG. 4 is a perspective view of a watch with six hands and a speaker, provided with a microcontroller according to the disclosure.

FIG. 4 illustrates a watch 400 provided with six hands 410, 411, 412, 414, 416, 418, and with a speaker 430. The watch has a housing 440 provided with a microcontroller (not shown) as described with respect to FIGS. 2 and 3. The microcontroller is connected to the transmitter 430 and to six motors (not shown) for operating the six hands.

FIG. 5, 500, lists the current consumptions for various elements of a microcontroller according to the prior art (column 510) and an exemplary microcontroller according to the disclosure (column 520). This comparison is obtained for a microcontroller connected to a gear box motor for operating the hand of a watch as described in FIG. 4.

As explained above, the microcontroller according to the prior art uses a CPU for driving the GPIO. A real time clock RTC wakes up the CPU to toggle the GIPO so that the gear box motor moves the hand by 3 degrees. In contrast the microcontroller according to the present disclosure uses an auxiliary device or controller for driving the GPIO. In this case the RTC wakes up the state machine of the controller to execute a command from the memory to move the hand by 3 degrees.

FIG. 5 lists the current consumption of the gear box, the current required by the CPU to drive the communication controller (GPIO), the current required by the CPU in the idle state, that is the CPU waiting for an interrupt, the current required by the state machine driving the GPIO, and the current required by the state machine in the idle state. The current consumption of the real-time clock RTC and of the oscillator crystal is negligible in both cases. Using the approach of the prior art, the average current consumption over 1 minute is 120 µA, compared to only 75 µA using the approach of the disclosure. Therefore a 60% lower power consumption can be achieved over one minute of operation of a single analog hand. In a scenario involving multiple hands to be moved at different times, further reduction in power consumption can be achieved.

Figure 6:
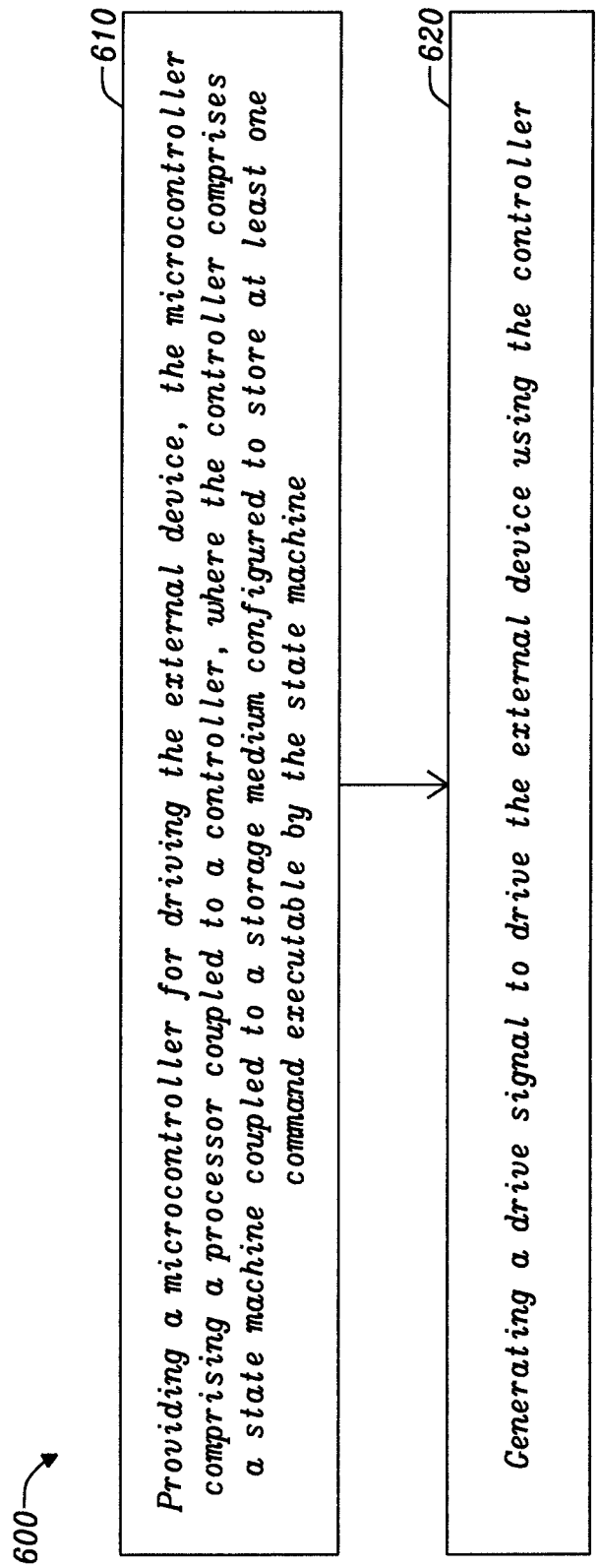
FIG. 6 is a flow chart of a method for driving an external device using the approach of the disclosure.

FIG. 6 is a flow chart of method 600, for driving an external device using the approach of the disclosure. At step 610, a microcontroller for driving the external device is provided, the microcontroller comprises a processor coupled to a controller, where the controller comprises a state machine coupled to a storage medium adapted to store at least one command executable by the state machine. At step 620, a drive signal is generated using the controller to drive the external device.

The storage medium may be configured by the processor with various commands and waveforms for operating different types of external devices. Therefore, the proposed microprocessor permits reducing power consumption while at the same time allowing for a broad flexibility of use.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. A microcontroller for driving an external device, the microcontroller comprising
    a processor coupled to a controller, the controller being configured to generate a drive signal to drive the external device;
    wherein the controller comprises a finite state machine coupled to an internal bus, and to a storage medium configured to store a plurality of commands executable by the finite state machine;
    wherein the processor is coupled to the storage medium via the internal bus;
    wherein the finite state machine is configured to execute a command to generate a logic signal; and
    a communication interface configured to generate the drive signal based on the logic signal;
    wherein the storage medium is configured to store a plurality of signal-profiles, and wherein each command among the plurality of commands is associated with a signal-profile among the plurality of signal-profiles.

2. The microcontroller of claim 1, wherein the plurality of commands is organized as a first queue and wherein the plurality of signal-profiles is organized as a second queue.

3. The microcontroller of claim 1, wherein the processor is part of a first power domain, and the controller is part of a second power domain, and further comprising a power domain controller coupled to the first power domain and to the second power domain.

4. The microcontroller of claim 3, further comprising a notifier coupled to the power domain controller, and the notifier configured to provide a notification signal to the power domain controller to enable the finite state machine.

5. The microcontroller of claim 4 wherein the notifier comprises a wake-up controller configured to receive an alert signal and to provide the notification signal upon receipt of the alert signal.

6. The microcontroller of claim 5, further comprising a terminal configured to connect the external device to the microcontroller, wherein the wake-up controller is coupled to the terminal and to the power domain controller, and the wake-up controller is configured to receive the alert signal from the external device and to send the notification signal to the power domain controller.

7. The microcontroller of claim 4 wherein the notifier further comprises a timer configured to send the notification signal at specific times.

8. The microcontroller of claim 1, wherein the external device comprises an actuator, and the plurality of commands are configured to operate the actuator, and the plurality of signal-profiles comprises a plurality of waveforms for driving the actuator.

9. The microcontroller of claim 1, wherein the external device comprises a transmitter for transmitting data, and the plurality of commands comprises a first command for enabling the transmitter and a second command for transmitting data.

10. The microcontroller of claim 9, wherein the signal-profiles comprise information to be transmitted by the transmitter.

11. The microcontroller of claim 1, wherein the microcontroller is configured for use with a plurality of external devices, and the communication interface comprises a plurality of communication controllers, each communication controller configured to control an external device among the plurality of external devices.

12. The microcontroller of claim 1, wherein the processor configures the storage medium.

13. A wearable device comprising the microcontroller of claim 1 coupled to one or more external devices.

14. The wearable device of claim 13, wherein the one or more external devices comprise at least one of a motor, a haptic device, a transmitter and a light.

15. A method of operating an external device, comprising the steps of:
    providing a microcontroller for driving the external device, the microcontroller comprising a processor coupled to a controller, and a communication interface;
    wherein the controller comprises a finite state machine coupled to an internal bus and to a storage medium configured to store a plurality of commands executable by the finite state machine;
    wherein the processor is coupled to the storage medium via the internal bus;
    executing a command to generate a logic signal using the finite state machine; and generating a drive signal based on the logic signal to drive the external device using the communication interface;
wherein the storage medium is configured to store a plurality of signal-profiles, and wherein each command among the plurality of commands is associated with a signal-profile among the plurality of signal-profiles.

\* \* \* \* \*